(12) United States Patent
Zazula et al.

(10) Patent No.: US 11,293,241 B2
(45) Date of Patent: *Apr. 5, 2022

(54) METHOD AND APPARATUS FOR THE RECOVERY OF DRILLING FLUID FROM SHAKER TAILINGS DURING ACTIVE DRILLING

(71) Applicant: National Oilwell Vareo, L.P., Houston, TX (US)

(72) Inventors: Rennie K. Zazula, Weyburn (CA); Dean M. Bird, Sherwood Park (CA); Mike R. Olson, Ponoka (CA); Neil P. Mackley, Edmonton (CA)

(73) Assignee: National Oilwell Varco, LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/844,779

(22) Filed: Apr. 9, 2020

(65) Prior Publication Data

US 2020/0232290 A1   Jul. 23, 2020

Related U.S. Application Data

(62) Division of application No. 15/073,382, filed on Mar. 17, 2016, now Pat. No. 10,704,345.

(51) Int. Cl.
*E21B 21/06* (2006.01)
*E21B 21/01* (2006.01)
(Continued)

(52) U.S. Cl.
CPC .......... *E21B 21/065* (2013.01); *B01D 21/262* (2013.01); *B01D 21/34* (2013.01); *E21B 21/01* (2013.01)

(58) Field of Classification Search
CPC ...... B01D 21/262; B01D 21/34; B01D 21/01; B01D 21/26; B01D 21/0012;
(Continued)

(56) References Cited

U.S. PATENT DOCUMENTS

| 2002/0104806 A1* | 8/2002 | Pullman | B01D 21/26 |
| | | | 210/744 |
| 2009/0178978 A1* | 7/2009 | Beebe | E21B 21/065 |
| | | | 494/43 |

(Continued)

*Primary Examiner* — Akash K Varma
(74) *Attorney, Agent, or Firm* — Conley Rose, P.C.

(57) ABSTRACT

A system and method for recovering drilling fluid from shaker tailings includes a hopper and a cover that is pivotable between a first position in which the hopper is uncovered and a second position in which the hopper is covered. In the first position, the hopper receives the tailings, which are pumped via a low shear pump to a centrifuge. The drilling fluid extracted in the centrifuge is stored in a holding tank. In the second position, the cover is angled with respect to the direction of gravity so as to divert shaker tailings from being received in the hopper. Some fluid from the holding tank is sprayed into the hopper through nozzles to convey the deposited tailings toward the pump. A level detector senses the level of the mixture in the hopper, and an associated control system controls the pump speed and the cover position to control the operation.

7 Claims, 10 Drawing Sheets

(51) Int. Cl.
*B01D 21/26* (2006.01)
*B01D 21/34* (2006.01)

(58) Field of Classification Search
CPC .. B01D 21/2488; B01D 21/00; B01D 21/267; B01D 33/00; B01D 33/03; B01D 53/24; E21B 21/065; E21B 21/06; E21B 21/01; E21B 21/066; E21B 21/067; E21B 21/062; B03B 7/00
USPC ..... 210/774, 747, 257.1, 744, 167, 121, 787
See application file for complete search history.

(56) References Cited

U.S. PATENT DOCUMENTS

| | | | |
|---|---|---|---|
| 2013/0112598 A1* | 5/2013 | Culver | E21B 21/066 209/10 |
| 2016/0076321 A1* | 3/2016 | Hurst | E21B 21/066 175/57 |

* cited by examiner

METHOD AND APPARATUS FOR THE RECOVERY OF DRILLING FLUID FROM SHAKER TAILINGS DURING ACTIVE DRILLING

CROSS-REFERENCE TO RELATED APPLICATIONS

This application is a divisional of U.S. application Ser. No. 15/073,382 filed Mar. 17, 2016, and entitled "Method and Apparatus for the Recovery of Drilling Fluid From Shaker Tailings During Active Drilling," which is hereby incorporated herein by reference in its entirety.

STATEMENT REGARDING FEDERALLY SPONSORED RESEARCH OR DEVELOPMENT

Not applicable.

BACKGROUND

Technical Field

This disclosure relates generally to apparatus used in solids separation techniques, and in particular, in the separation of drill cuttings from drilling fluid. More particularly, it relates to methods and apparatus for the recovery of valuable drilling fluid from the tailings that come off of conventional shaker machines which make a first separation of drilling fluid from drill cuttings at the drilling site.

General Background

For the ultimate recovery of oil and gas, boreholes are typically drilled by rotating a drill bit that is attached to the bottom of a drill string. With weight applied to the drill string, the rotating drill bit engages the earthen formation and proceeds to form a borehole toward a target zone. This produces large quantities of rock particles, typically referred to as "drill cuttings" or "drilled solids." To aid in the removal of drill cuttings, as is necessary to form the borehole, pressurized drilling fluid is continuously pumped down the drill string to the drill bit. The fluid exits through nozzles in the bit and returns to the surface carrying with it the drill cuttings.

When it returns to the surface, the fluid is a slurry of fine solids that are important components of the drilling fluid, as well as the coarser drill cuttings, and the base liquid. The base liquid portion of the drilling fluid may be oil or water. But in either case, it is highly desirable to recover and reuse as much of the drilling fluid as possible because it is expensive. It is also desirable to remove the drilling fluid from the coarse drill cuttings so that the cuttings can be disposed of in a cost-effective and environmentally safe manner.

At the surface, some of the drill cuttings are separated from the drilling fluid by vibratory screening machines, commonly referred to as "shaker machines." The separated cuttings or "shaker tailings" are still wetted by the drilling fluid. Although these tailings may be discarded, they can contain substantial amounts of the oil or water-based drilling fluid. The residue on oil based cuttings consists of an emulsion of aqueous salt solution in a light mineral oil base. In some instances, these cuttings have been collected and mixed with a stabilizing product and shipped to a processing facility for oil or water residue removal, however, this adds significant cost due to the transport and processing. Additional added costs arise from the need to add new drilling fluid or fluid constituents in order to recover for the lost volume of drilling fluid.

Cleaning systems have been developed for reducing the hydrocarbon content in shaker tailings at the drilling site. Some such systems employ an initial washing technique using chemicals that are potentially hazardous to workers. Others use acids, surfactants, and/or dispersants, followed by centrifugal separation and discharge of the "cleaned" solids. While theoretically producing cleaner solids, the technique results in the secondary problem of producing large volumes of oil-contaminated wash water for disposal.

Another on-site system involves moving the shaker tailings by augers and conveyors and then grinding the solids, producing ultra-fine solids that are then slurried by agitators and processed with centrifuges. These systems, however, have large footprints and necessitate added set up, maintenance and safety procedures. Further, the mechanical forces these systems employ degrade (make smaller) the drilled solids, and then returns them to the active drilling fluid. The smaller particles, called low gravity solids or ultra-fines, can lower drilling rates, yet they cannot be removed by the usual solids control equipment present at the rig. Thus, the drilling fluid to which these ultafines have been added must be blended with new base oil or water in order to provide the drilling fluid with the proper density and consistency. The needed blending and fluid maintenance can substantially increase cost.

Some thermal methods have been used which employ either thermal destruction of the hydrocarbons associated with the cuttings, or thermal evaporation of the oil, followed by condensation and recovery of oil portions. Such systems have suffered the disadvantages of high mechanical wear, corrosion, and have also had a high energy demand due, in large part, to the necessity of evaporating all water associated with the cuttings. Further, these systems are generally set up away from the drilling site, thereby adding transportation cost and creating the possibility of spills.

Thus, there remains a need in the art for methods, systems and apparatus for recovering valuable drilling fluid from shaker tailings in a safe, efficient, and cost effective manner. Automated recovery systems, methods and apparatus that can be employed at the drilling site and that work in concert with standard solids control equipment present at the rig, have a small footprint, and that return fluid to the active drilling fluid system continuously and without the introduction of ultra-fines, would be especially welcomed by the industry.

SUMMARY OF THE DISCLOSURE

Disclosed is a system and method for recovering drilling fluid from shaker tailings that may be employed at the drilling site and during active drilling operation.

In one embodiment, the system includes a hopper comprising an interior chamber, a plurality of nozzles configured to spray fluid into the chamber, and a cover that is pivotable between a first position in which the chamber is uncovered and a second position in which the chamber is covered. A conveying surface on the cover forms an acute angle with respect to the direction of gravity when the cover is in the second position. The system further includes a holding tank for containing a volume of drilling fluid, a first pump configured to convey drilling fluid from the holding tank to the nozzles, and a second pump configured to convey the mixture of drill cuttings and drilling fluid from the hopper chamber to a first centrifuge. The first centrifuge is configured such its effluent is conveyed to the holding tank. A first level detector is provided and configured to sense the level of the mixture in the hopper chamber and to provide an output to a control system. A drive motor is coupled to the hopper cover and configured to move the cover between the first position and the second position in response to a control signal provided by the control system. The drive motor moves the hopper cover to the second position when the level in the hopper chamber reaches a first predetermined level so tailings are diverted by the cover's conveying surface and not deposited within the hopper.

In one embodiment, the control system is configured to control the speed of at least one of the first and second pumps in response to the output from the first level detector. The system may also include a third pump configured to convey drilling fluid from the holding tank to the suction side of a forth pump, wherein the discharge side of the forth pump is configured to convey drilling fluid to a second centrifuge. The second centrifuge may be configured such that the effluent from the second centrifuge is conveyed to a rig tank.

In one embodiment, the system includes a second level detector configured to sense the fluid level in the holding tank and provide an output to the control system in response to the sensed fluid level, wherein the control system is configured to turn on the third pump when the level in the holding tank rises to a predetermined level. The control system may be further configured to turn off at least one of the first and second pumps when the level in the hopper chamber reaches a second predetermined level. The first level detector may be one that provides an output signal that is proportional to the level of the mixture detected in the hopper chamber.

In one embodiment, the system further comprises a vibratory screening machine configured to convey from a screening surface to the hopper chamber the mixture of drill cuttings and drilling fluid, the hopper being positioned relative to the screening surface such that the mixture is conveyed by gravity into the hopper chamber when the cover is in the first position and the mixture is conveyed by gravity on to the conveying surface of the cover when the cover is in the second position.

In one embodiment, the hopper chamber comprises a bottom that slopes from a high end toward a low end, and wherein the suction side of the second pump is in fluid communication with the chamber at the low end.

In one embodiment, the first and/or the second pumps are low shear pumps, such as vortex pumps.

A method for recovering drilling fluid from a mixture that includes drill cuttings and drilling fluid is disclosed and includes: conveying into an open hopper chamber a feed stream comprising a mixture of drill cuttings and drilling fluid; pumping a portion of the mixture from the hopper chamber to a first centrifuge; conveying the drilling fluid effluent from the first centrifuge to a fluid holding tank; pumping fluid from the fluid holding tank into the hopper chamber through a plurality of nozzles; using a cover, closing the hopper chamber when the level of the mixture in the hopper chamber reaches a first predetermined level and thereby diverting the feed stream outside the chamber.

In an embodiment, the method further includes comprising stopping the pumping into the first centrifuge when the level of the mixture in the hopper chamber is below a second predetermined level and/or stopping the pumping from the holding tank into the hopper chamber through the nozzles when the level in the hopper chamber is below a second predetermined level.

In one embodiment, the method further includes pumping fluid from the holding tank to a second centrifuge and conveying the effluent from the second centrifuge to a rig tank of an active drilling fluid system.

In one embodiment, the method further includes monitoring the level of mixture in the hopper chamber, and changing the pumping speed of at least one of the pumps in response to a change in the monitored level of the mixture in the hopper chamber. In an embodiment, the method includes simultaneously operating the first pump at a first speed and the second pump at a second speed and, in response to a change in level of the mixture in the hopper chamber, changing the speed of at least one of the pumps to a third speed.

In one embodiment, the method includes monitoring the level of mixture in the hopper chamber during active drilling operations, and continuing active drilling operations after the cover has closed the hopper chamber.

Disclosed too is apparatus for recovering drilling fluid from a mixture that includes drill cuttings and drilling fluid where the apparatus comprises: a hopper having a chamber, a chamber opening, and a cover, the cover being pivotable between an open position in which the chamber is open to receiving a flow of the mixture, and a closed position in which the chamber is closed to receiving a flow of the mixture. The cover includes a cover having a conveying surface that, when the cover is in the closed position, forms an acute angle with respect to the direction of gravity. The apparatus includes a control system responsive to the level of the mixture in the chamber and a motor mechanically coupled to the cover and electrically coupled to the control system, the control system being configured to cause the motor to rotate the cover to the closed position when the level of the mixture in the chamber reaches a predetermined level.

In one embodiment, the apparatus includes an elongate support structure or skid coupled to the hopper and having a footprint; a low shear pump supported by the support structure and configured such that the suction side of the pump is in fluid communication with the chamber at the second end of the hopper; a plurality of nozzles configured to spray fluid into the chamber; and a conduit on the support structure configured to supply fluid to the nozzles. In one embodiment, the cover is rotatably connected to each end of the hopper and configured to pivot about an axis of rotation.

In one embodiment, the cover is coupled to the hopper such that the axis of rotation of the cover is substantially parallel to, but laterally offset from, a vertical plane that bisects the hopper.

In one embodiment, the cover is coupled such that the cover rotates more than 90 degrees but less than 180 degrees when moving from the open position to the closed position, and in one embodiment, the conveying surface forms an angle with respect to the direction of gravity that is not greater than 59 degrees when in the closed position.

Thus, embodiments described herein include various combinations of features intended to address certain shortcomings associated with certain prior devices, systems, and methods. The various combinations and features described above, as well as others, will be readily apparent to those skilled in the art upon reading the following detailed description, and by referring to the accompanying drawings.

BRIEF DESCRIPTION OF THE DRAWINGS

For a detailed description of the disclosed exemplary embodiments of the invention, reference will now be made to the accompanying drawings in which.

DETAILED DESCRIPTION OF DISCLOSED EXEMPLARY EMBODIMENTS

Figure 1:
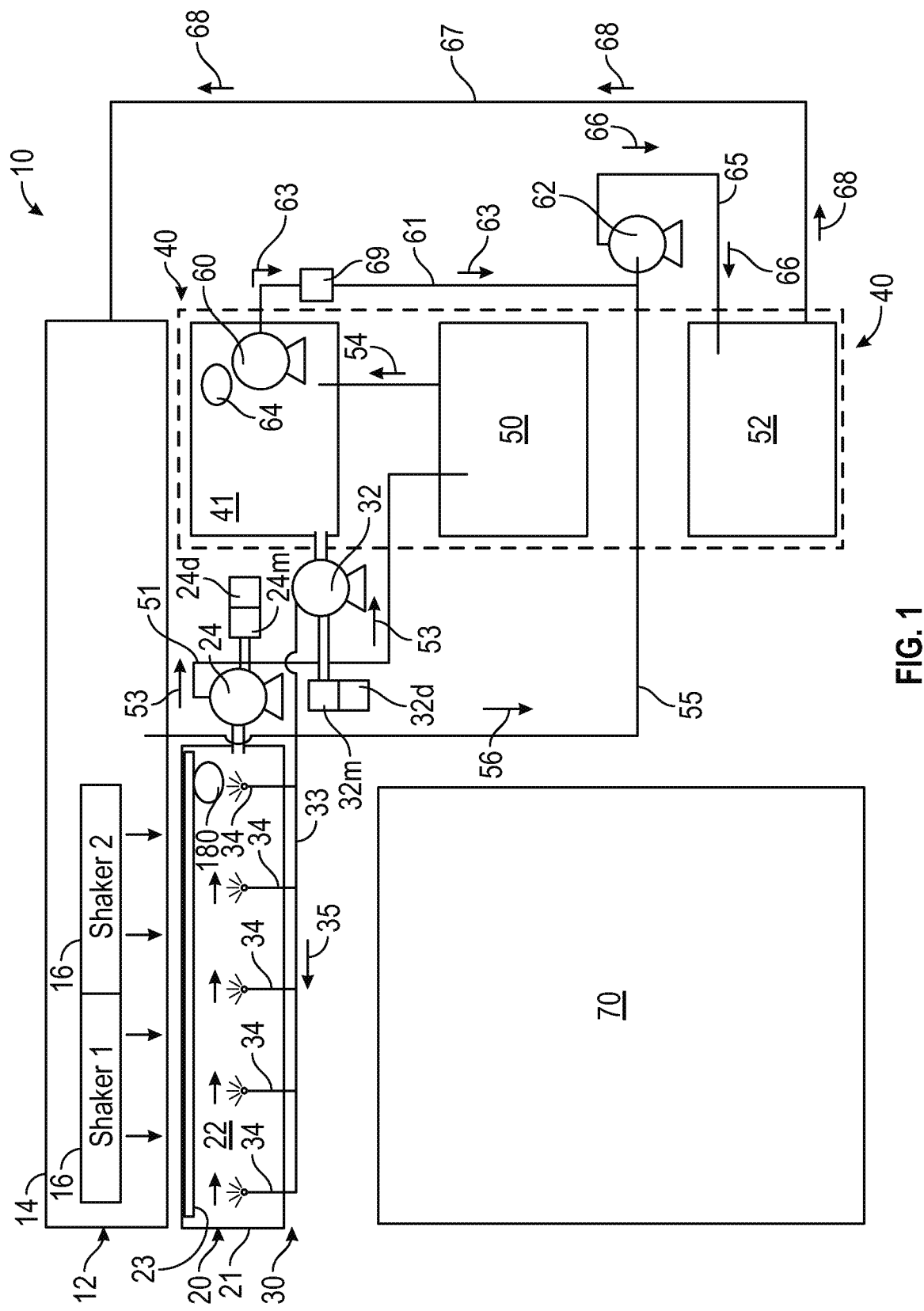
FIG. 1 is a schematic view of a system for the recovery of drilling fluid from shaker tailings.

This disclosure is directed to and describes various exemplary embodiments. The discussion of any embodiment is meant only to be exemplary of that embodiment, and is not intended to intimate that the scope of this disclosure, including the claims, is limited to that embodiment. The drawing figures are not necessarily to scale. Certain depicted features and components may be shown exaggerated in scale or in somewhat schematic form, and some details of conventional elements may not be shown in interest of clarity and conciseness.

In the following discussion and in the claims, the terms "including" and "comprising" are used in an open-ended fashion, and thus are to be interpreted to mean "including, but not limited to . . . ." Also, the term "couple" or "couples" is intended to mean either an indirect or direct connection. Thus, if a first device couples to a second device, the connection between the two devices may be through a direct connection between the two devices, or through an indirect connection, one made via other intermediate devices, components, and connections. In addition, if the connection transfers electrical power or signals, whether analog or digital, the coupling may comprise wires or a mode of wireless electromagnetic transmission, for example, radio frequency, microwave, optical, or another mode. So too, the coupling may comprise a magnetic coupling or any other mode of transfer known in the art, or the coupling may comprise a combination of any of these modes. Further, as used herein, the terms "axial" and "axially" generally mean along or parallel to a given axis (e.g., a central axis of a body), while the terms "radial" and "radially" generally mean perpendicular to a given axis. For example, an axial distance refers to a distance measured along or parallel to the given axis, and a radial distance means a distance measured perpendicular to the axis.

Recovery System—Overview

Referring first to FIG. 1, fluid recovery system 10 is shown in schematic form and generally includes: a rig tank module 12; a collection hopper skid or module 20 that includes hopper 21, diverter lid or cover 23, and hopper pump 24; a jetting system 30 that includes jetting pump 32; a fluid processing module 40 that includes fluid recovery tank 41 and centrifuges 50, 52. Fluid recovery system 10 further includes transfer pump 60, feed pump 62 and disposal bin 70. The system is controlled by a control system 300, best shown in FIG. 10, and may be employed while active drilling operations are ongoing. That is, system 10 may be employed so as to return to the active drilling fluid system the drilling fluid that has been recovered from the shaker tailings.

Rig Tank Module

Referring to FIG. 1, rig tank module 12 is shown to include one or more tanks 14 for containing a volume of drilling fluid, and may be referred to herein as a "mud tank" or a "rig tank." The function of the rig tank 14 is to maintain a supply of drilling fluid that is of sufficient cleanliness, density and other needed qualities, making it ready to be pumped down hole to facilitate the drilling operation. Suspended on a deck above mud tank 14 are one or more vibratory screening machines 16, also commonly referred to as "shaker machines" or "shakers." In the rig tank module 12, two such shakers 16 are shown, however, fewer or more shakers may be employed depending upon the application. The shakers may be any conventional shaker, such as a Brandt King Cobra.

As is conventional in this field, the shakers 16 include vibratory screening surfaces which, during drilling operation, receive a slurry of solids-laden drilling fluid that, after being pumped down hole, returns to the surface carrying drilled solids. The slurry is deposited on the vibrating screens of the shakers. The drilling fluid, along with solids that are small enough to pass through the screen openings, fall by gravity through the screens and into the rig tank 14 for reuse in the active drilling fluid system without further processing. The drill cuttings that are too large to pass through the openings in the screen, are transported along the screen surface by the vibration that is imparted to them by the shaker machine 16. The cuttings transported along the screen surfaces include a volume of drilling fluid that remains attached to the solids, and these "shaker tailings" are conveyed off the shaker machine 16 and allowed to fall by gravity toward the collection hopper module 20 so they can be recovered at the drilling site and during active drilling operations.

Collection Hopper Module

The components and construction of hopper module 20 are described in greater detail below, particularly with reference to FIGS. 2-7. However, for the present purpose of conveying an understanding of the overall operation of fluid recovery system 10, and referring still to FIG. 1, it is to be understood that hopper module 20 includes a trough-like hopper 21, and a pivotable hopper cover 23. Cover 23 is configured to be rotatable between a first or open position, which allows the shaker tailings to fall by gravity from the shaker machines 16 into the open hopper chamber 22, and a second or closed position, in which the cover 23 covers the chamber 22 and thereby diverts the falling flow of shaker tailings outside the hopper chamber 22 and to disposal bin 70.

Aided in part by the shape and slope of the hopper 21, and by jetting system 30, all of which are described in more detail below, the shaker tailings that are deposited in hopper 21 are conveyed toward the lower end of hopper 21 that is adjacent to hopper pump 24. The suction end of hopper pump 24 is in fluid communication with the hopper chamber 22 and thus pump 24 draws the shaker tailings from chamber 22 and discharges them to the feed end of a centrifuge 50, the tailings being conveyed along feed line 51 in the direction shown by arrows 53.

As used herein, the term "low shear pump" means a pump that imparts low or minimal shear forces to the mixture or slurry being conveyed through the pump and limits the formation of ultra-fines. That is, excessive shear causes the drilled solids to degrade and results in ultra-fines becoming part of the recovered drilling fluid, a highly undesirable condition as, when they are introduced into the active drilling fluid system, they hamper efficient drilling, are not easily removed, and typically require that substantial additional quantities of new drilling fluid be added to the active system. Low shear pumps include vortex pumps, a design in which the impeller is recessed in the pump body so as to be out of contact with the main stream of fluid flow, thereby minimize solids degradation from occurring due to the entrained solids impacting the impeller. In one embodiment, hopper pump 24 is low shear pump, and more particularly is a vortex pump, such as a Mission Magnum Vortex pump manufactured by National Oilwell Varco. A vortex pump, having its impeller outside the main flow area, produces a primary vortex or swirling action that, in turn, creates a secondary vortex in the main flow path the produces fluid flow along the desired path. Other low shear pumps include eccentric disc pumps, and progressive cavity pumps.

Jetting System

Jetting system 30 includes jetting pump 32, a primary feed line or conduit 33, and a plurality of branch conduits 31, each conveying fluid from conduit 33 to a nozzle 34 that is mounted inside hopper chamber 22. As explained in more below, the suction side of jetting pump 32 is in fluid communication with fluid recovery tank 41. The discharge from jetting pump 32 is conveyed via primary feed line 33 in the direction of arrow 35 to each of the nozzles 34. In one embodiment, jetting pump 32 is a low shear pump vortex pump such as a Mission Magnum Vortex pump manufactured by National Oilwell Varco. As with hopper pump 24, it is desirable to minimize solids degradation that might occur through the application of a typical feed pump that is not a low shear pump.

Fluid Processing Module

Fluid processing module 40 includes recovery tank 41 and centrifuges 50, 52. Tank 41 may also be referred to as a fluid holding tank as it receives and holds drilling fluid that has been recovered via a first centrifuge process. In one embodiment, tank 41 and centrifuges 50, 52 are mounted on the same skid or other support structure, one that is dimensioned to fit on a truck or trailer bed that can be transported on the highway. In one embodiment, the centrifuges 50, 52 are aligned on the support structure, end to end, with the fluid recovery tank 41 mounted above the aligned centrifuges.

Regardless of the physical arrangement, fluid recovery tank 41 is a vessel configured to hold a supply of drilling fluid that has undergone at least a first "cleaning" by virtue of the shaker tailings first passing through centrifuge 50. That is, as described above, hopper pump 24 conveys the shaker tailings to the feed end of centrifuge 50. Centrifuge 50 is a variable decanting centrifuge, such as Brand model number 2172. In a well understood manner, the shaker tailings entering centrifuge 50 are divided into a liquid component and a solids component. The liquid component, or effluent, is conveyed to fluid recovery tank 41 via conduit 54 while the solids are removed from the mixture and transmitted to disposal bin 70 by mechanical conveyor and/or gravity feed. In this manner, the shaker tailings undergo a first process by which the valuable drilling fluid otherwise attached to the drilled solids is recovered and conveyed to recovery tank 41 for use with jetting system 30, or for further processing as explained below.

Transfer pump 60, which may be a positive displacement pump, such as Model 34401 Moyno pump manufactured by National Oilwell Varco, is configured to have its suction side in fluid communication with recovery tank 41. Pump 60 is driven by a 2 HP motor 60$m$ (FIG. 10) and, in one embodiment, is physically located above tank 41. When activated, pump 60 discharges fluid from recovery tank 41 to the suction side of feed pump 62 along line or conduit 61, the drilling fluid being conveyed in the direction shown by arrows 63. A flow meter 69 is provided in line 61 for measuring the volume of drilling fluid that has been recovered from the shaker tailings and processed by centrifuge 50.

Feed pump 62, which may be a 25 HP pump such as a Mission Magnum pump, has its suction side also in fluid communication with rig tank 14 via conduit 55, allowing pump 62 to draw fluid from rig tank 14 in the direction shown by arrow 56. In normal operation, fluid is drawn from tank 41, however, a valve (not shown) is provided to select feeds to pump 62 such that, for maintenance to line 61, pump 60 or flow meter 69, fluid flow may be diverted through line 55. Feed pump 62 is driven by a 25 HP motor 62$m$ (FIG. 10) and has its discharge side in fluid communication with the feed end of centrifuge 52 via conduit 65, the fluid being conveyed to centrifuge 52 in the direction shown by arrows 66. Centrifuge 52 is a decanting centrifuge, such as Brandt model number 2172. In this arrangement, the drilling fluid conveyed either from recovery tank 41 or from rig tank 14 undergoes a secondary removal process in that the mixture entering centrifuge 52 is divided into a liquid component and a solids component. The liquid component, or effluent, is conveyed to rig tank 14 via conduit 67 in the direction shown by arrows 68 and thus becomes part of the fluid of the active drilling fluid system. The solids removed by centrifuge 52 are transmitted to disposal bin 70 by mechanical conveyor and/or gravity. In this manner, drilling fluid having already been "cleaned" at least via undergoing the centrifuge process from centrifuge 50, undergoes a further "cleaning" by centrifuge 52.

Disposal Bin 70

As has been described, the solids removed by centrifuges 50, 52, are transported to disposal bin 70. Likewise, during conditions in which hopper cover 23 is closed, as described below, shaker tailings that would otherwise fall into hopper chamber 22 for fluid removal are diverted by cover 23 into disposal bin 70. The material in disposal bin 70 may then be gathered and treated or disposed of via conventional methods.

Collection Hopper

Figure 2:
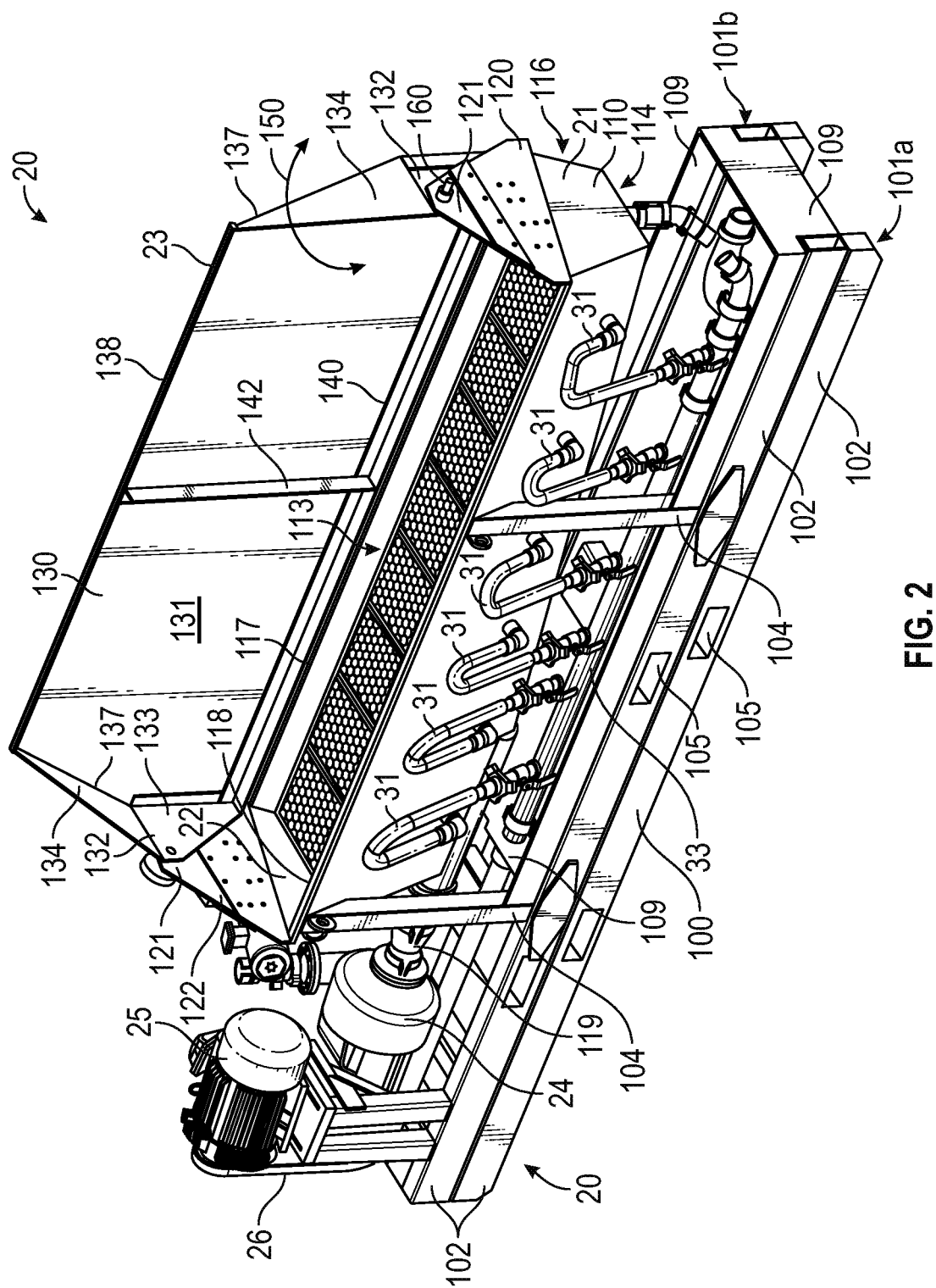
FIG. 2 is a perspective view of a collection hopper module or skid, which can be employed as a portion of the system disclosed in FIG. 1.
Figure 3:
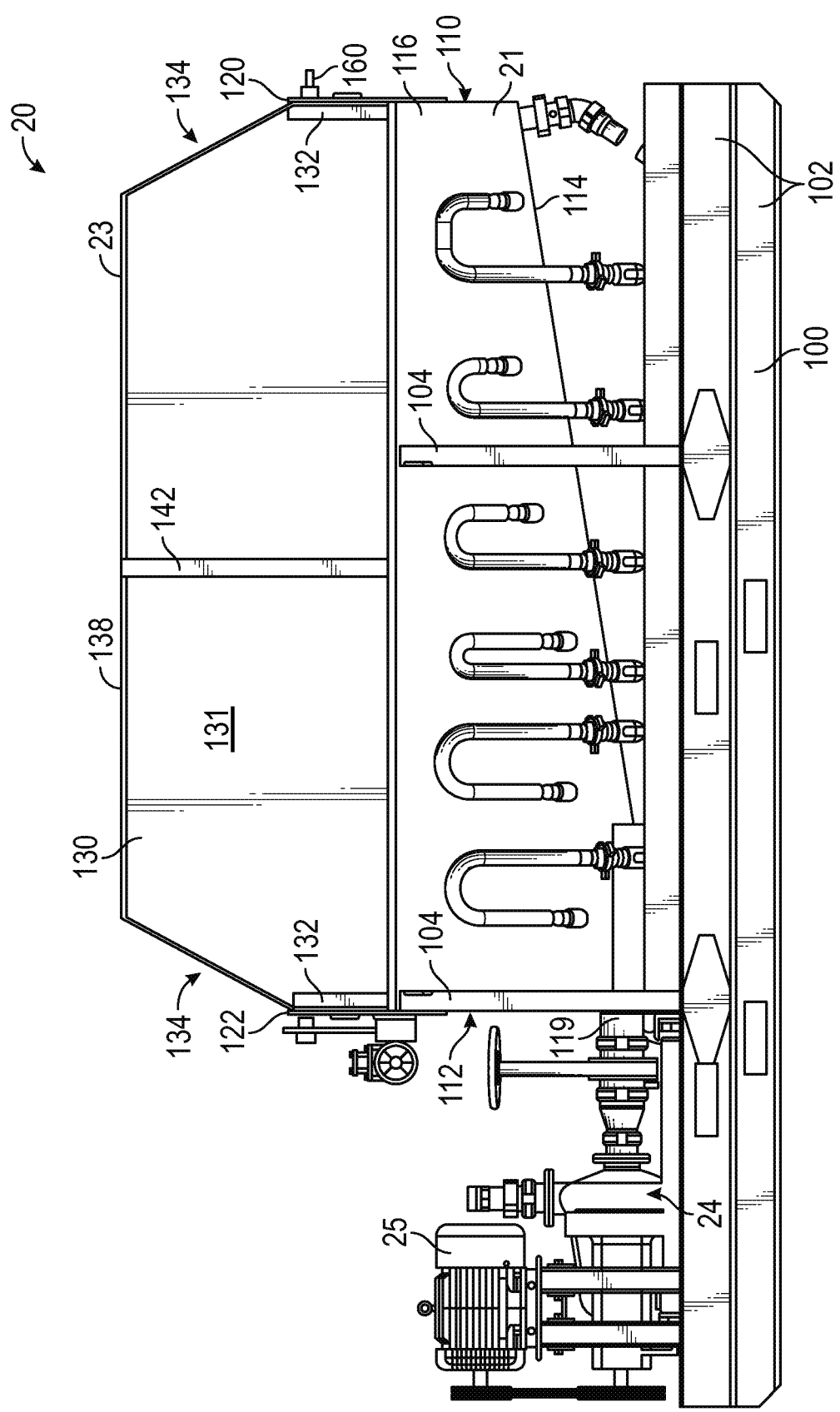
FIG. 3 is a front elevation view of the collection hopper module of FIG. 2.
Figure 4:
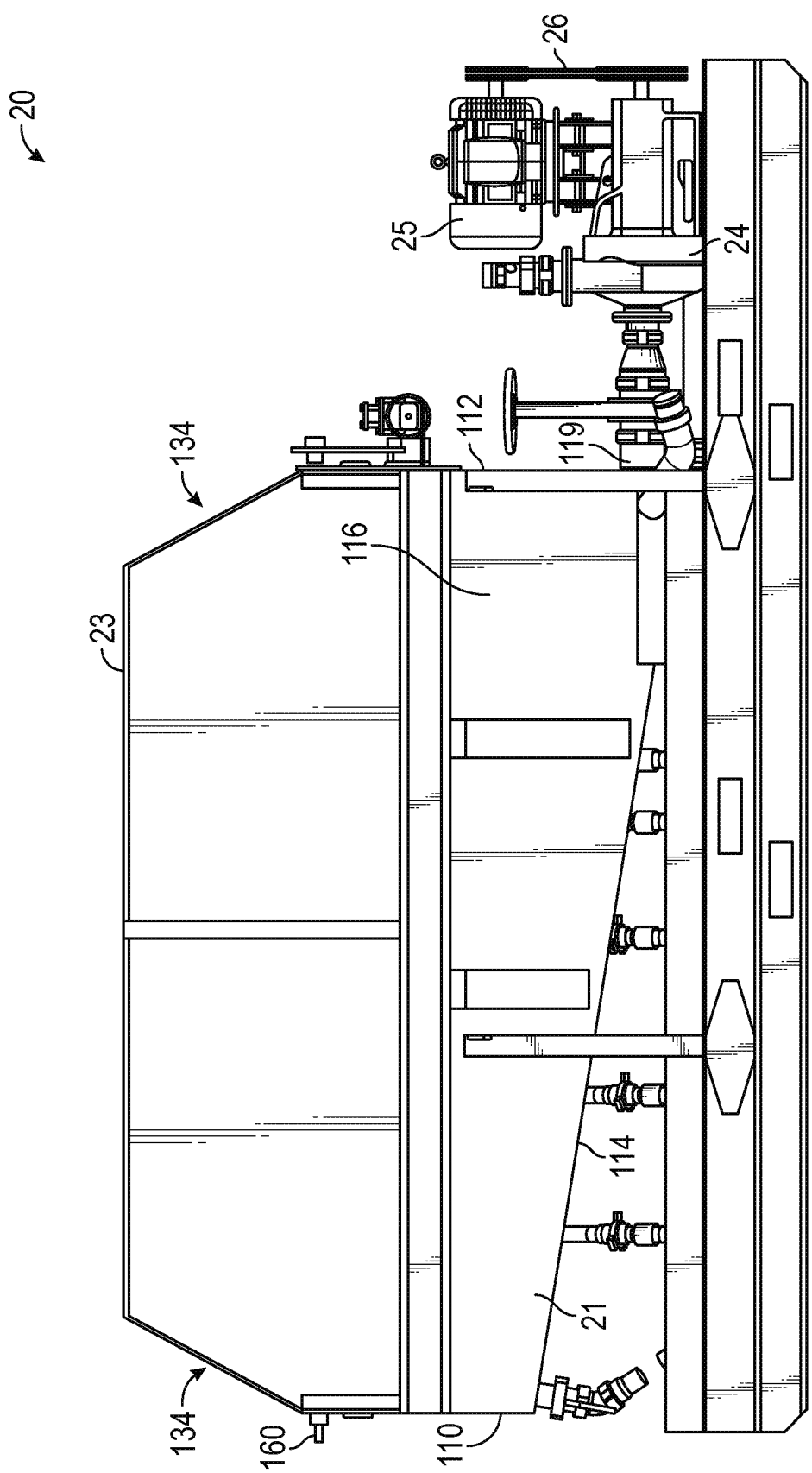
FIG. 4 is a rear elevation view of the collection hopper module of FIG. 2.
Figure 9:
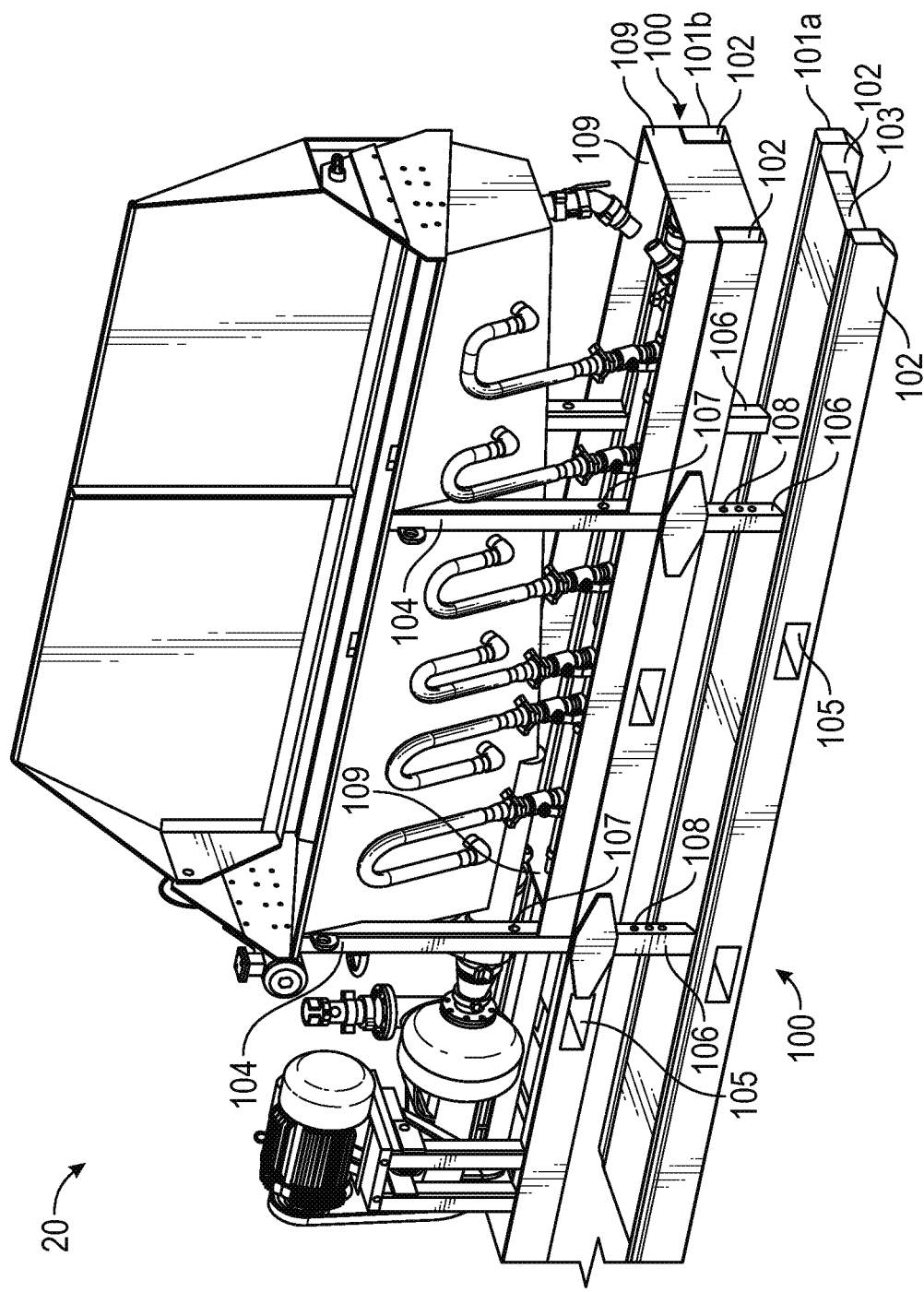
FIG. 9 is a perspective view of the collection hopper skid of FIG. 2, with the hopper shown in an elevated position.

Drilling hydrocarbon wells requires the use of large, complex assemblies of machinery and systems. Most land-based drilling rigs are designed to be transported by trucks and trailers, and thus are made to disassemble into skid-mounted modules sized so as to be quickly and easily loaded onto, transported by, and offloaded from a trailer by cranes, winches and the like. This modular approach helps minimize the time needed for rig up and rig down operations. Highway-transportable hopper skid or module 20, best shown in FIGS. 2 and 9, includes support structure 100 configured to support hopper 21, hopper pump 24, pump drive motor 24$m$, and the fluid delivery conduits of jetting system 30. Support structure 100 forms an equipment skid that may be employed to raise and lower hopper 21 as needed to best fit the hopper chamber 22 beneath the shaker machines 16 to receive the tailings. FIG. 2 shows the skid and hopper in their lowest positions, and FIG. 9 depicts them in their highest position.

Support structure 100 includes lower and upper frames 101a, b, each including longitudinal channel members 102 and transverse members 103 extending therebetween. Longitudinal members 102 include apertures 105 to provide access for lifting and tie down. Extending upwardly from frame 101b are vertical support members 104, and extending upwardly from frame 101a are vertical supports 106 that are received by and telescope within members 104. In this embodiment, vertical support members 104 and 106 are formed of tubular steel with square cross sections. To position hopper at the appropriate height, frame 101a is held on grade, and frame 101b is lifted and separated from frame 101a. At the appropriate height, pins (not shown) are placed through aligned holes 107, 108 that are provided in vertical supports 104, 106 respectively. In one embodiment, frame 101b is maintained at a position of up to 18 inches above frame 101a. Frame 101b includes an open enclosure formed by upwardly extending walls 109 beneath hopper 21 to capture any spillage or leaks.

Referring now to FIGS. 2, and 5-7, hopper 21 includes a pair of hopper ends 110, 112 coupled to a hopper bottom 114 and to a pair of opposing and elongate sides 116. Sides 116 extend between and are attached to the ends 110, 112, and are attached the hopper bottom 114. Collectively, hopper bottom 114, ends 110, 112, and sides 116 define hopper chamber 22 that is to receive the shaker tailings from shaker machines 16. The opening 118 of hopper chamber 22 through which the shaker tailings are received is defined, in part, by the upper edges 117 (FIG. 2) of hopper sides 116. Vertical support members 104 are attached to hopper sides 116 adjacent the chamber opening 118, i.e., adjacent the upper edges 117 of the elongate sides 116.

Figure 6:
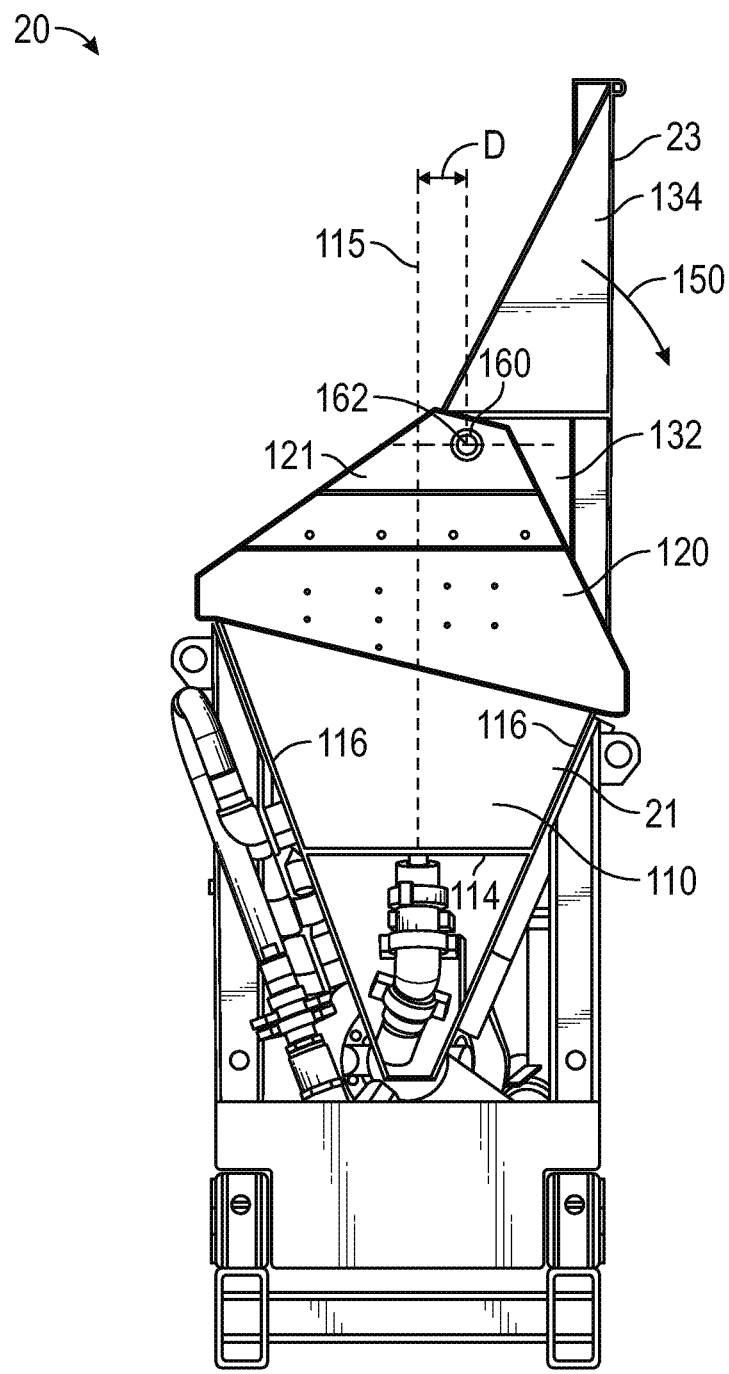
Figure 7:
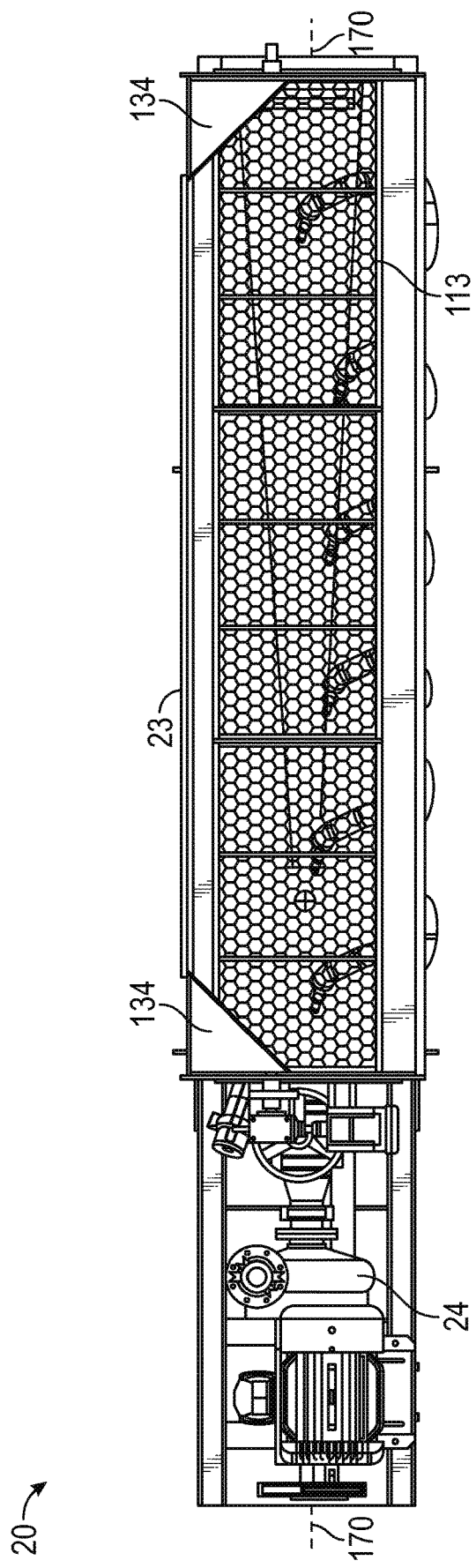
FIG. 7 is a top or plan view of the collection hopper module of FIG. 2.

From chamber opening 118 to the hopper bottom 114, sides 116 slope inwardly toward one another and toward the hopper centerline 170 (FIG. 7). Further, the hopper bottom 114 slopes from end 110 toward end 112. In this configuration, end 110 may be referred to as the "high end" whereas end 112 may be referred to as the "low end." The suction side of hopper pump 24 is in fluid communication with the hopper chamber 22 at a location adjacent low end 112 via conduit 119. Given this configuration, shaker tailings that have been deposited into hopper 21 are conveyed by gravity towards the hopper longitudinal centerline 170 and the vertical plane 115 (best shown in FIGS. 5, 6) that contains centerline 170 (FIG. 7), and are also conveyed from high end 110 to low end 112 by momentum supplied by jetting pump 32, nozzles 34 and gravity. In this manner, the hopper chamber 22 defines a trough for conveying shaker tailings towards the suction end of hopper pump 24. A course screen or grate 113 is positioned within chamber 22 adjacent opening 118 and is disposed between sides 116 and ends 110, 112, Grate 113 serves to prevent debris from entering the trough and being conveyed toward the intake of hopper pump 24 and, in one embodiment, has 2 inch openings.

Attached to each hopper end 110, 112 is an upwardly extending cover mount 120, 122 for supporting pivoting cover 23. In one embodiment, each mount 120, 122 is generally triangular in shape and tapers from a wider portion that is adjacent to the hopper sides 116, to a narrower portion 121 that extends to a position above the chamber 22.

Hopper cover 23, best described with reference to FIG. 2, includes diverter plate 130, a pair of connector plates 132, and a pair of angled cover ends 134. Diverter plate 130 includes a generally planar conveying surface 131, a pair of inwardly-tapered edges 137 and a lateral edge 138 that intersects tapered edges 137. Connector plates 132 are spaced apart and connected to diverter plate 130 so as to extend in a direction generally perpendicular from the conveying surface 131. Each connector plate 132 is generally triangular in shape and tapers from a wider portion that is adjacent to diverted plate 130 to a narrower portion 133 that extends to a position distal to the plate 130. Cover 23 also includes a pair of angled cover ends 134, each being coupled to and extending between a connector plate 132 and a tapered edge 137 of diverter plate 130.

An elongate support member 140 extends between and is connected to each connector plate 132 and also to diverter plate 130. A transverse support member, such as channel 142, is provided and coupled to support member 140 and diverter plate 130, and extends to edge 138 of diverter plate 130. Support members 140, 142 provide added rigidity to cover 23. Additional support members, such as channel 144 (FIG. 3), may be provided to further increase the rigidity of cover 23.

Figure 5:
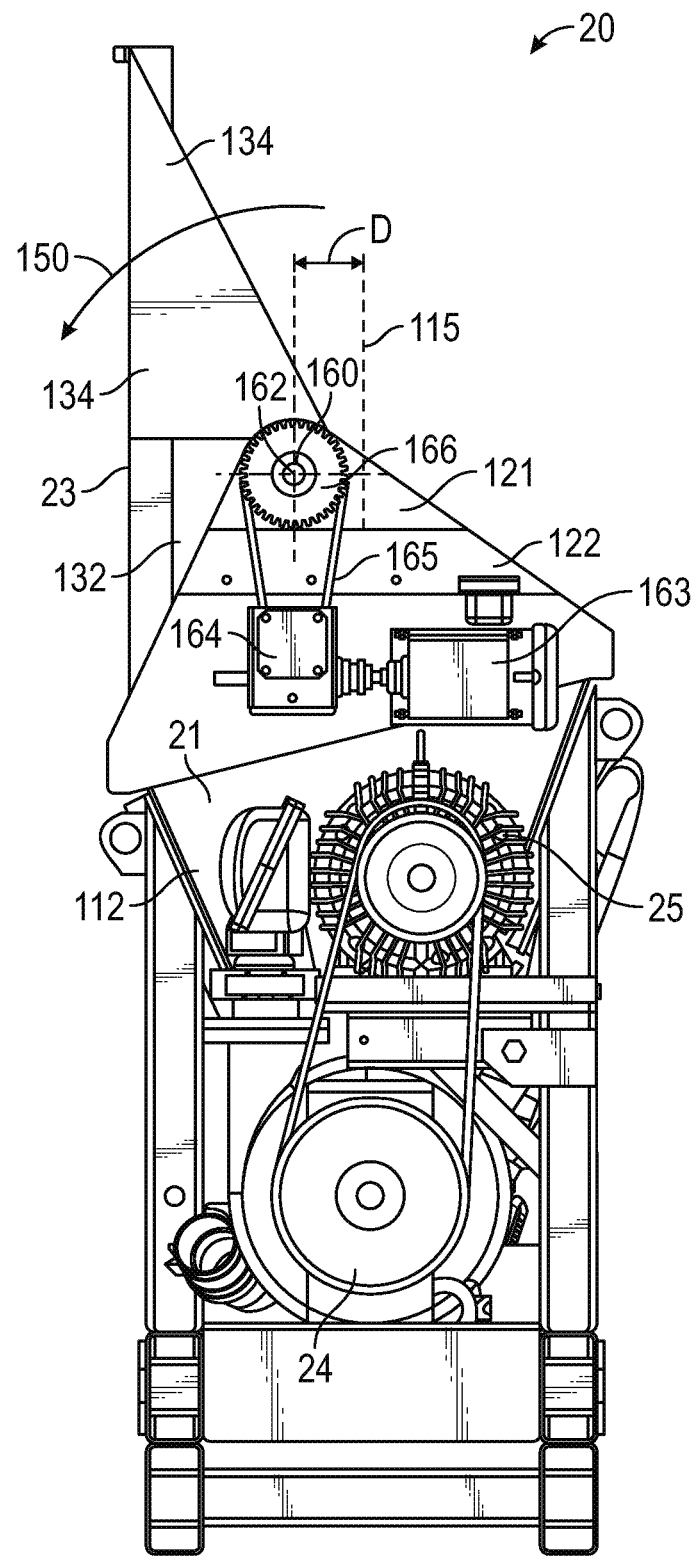
FIGS. 5 and 6 are end elevation views of the collection hopper module of FIG. 2.

Referring now to FIGS. 2, 5-6, cover 23 is rotatably connected to each end of the hopper 21, allowing cover 23 to rotate or pivot relative to hopper 21. In more detail, each connector plate 132 of cover 23 is disposed inside and adjacent to one of the cover mounts 120, 122. Pin members 160 extend through aligned apertures that are formed in mounts 120, 122. The pins 160 and receiving apertures are axially aligned so as to define an axis of rotation 162 about which cover 23 is permitted to pivot or rotate. In the embodiment shown, each pin 160 is rigidly, non-rotatably, fixed to a connector plate 132 and is allowed to rotate within the aperture formed in the adjacent cover mount 120, 122. Also, in the embodiment shown, the pin 160 that is disposed through mount 122 at low end 112 of hopper 21 is motor-driven, such that, the rotation of the pin 160 extending through mount 122 will cause rotation of cover 23 in the direction shown by arrows 150. Motor 163, best shown in FIG. 5 may be, for example, a ½ HP motor that, via gear box 164, chain 165 and gear 166, rotates pin 160. In the embodiment shown, motor 163 is an electric motor, but a hydraulic motor may alternatively be employed. Further, although the embodiment depicted and described above employs only one driven pin, in other embodiments, each pin 160 may be driven, and pins 160 may be driven by a single motor via appropriate linkages, or each driven by a dedicated motor.

As best shown in the end views of FIGS. 5, 6, the shape and position of cover mounts 120, 122 and connector plates 132, and the positioning of pins 160, cooperate to attach cover 23 to hopper 21 such that the cover's axis of rotation 162 is laterally offset by a distance D from the hopper's longitudinal centerline 170, and the vertical plane 115 that passes through and contains hopper centerline 170 (FIG. 7). As explained in more detail below, cover 23 need not pivot or rotate 360 degrees about axis 162. In one embodiment, the degree of rotation is less than 180 degrees, and in another, is approximately only 135 degrees.

Mounted in hopper chamber 22 is a level detector 180, shown schematically in FIG. 1. Level detector 180, which may be, for example, model number CLIS-NOV-0100_as manufactured by FPI Sensors International provides to the control system 300 an output signal that is proportional to the level of tailings detected in hopper chamber 22. The control system 300 receives the output signal from the level detector 180 and speeds up or slows down the speed of the pumps 24, 32, appropriately, as described in more detail below.

Control System 300

Figure 10:
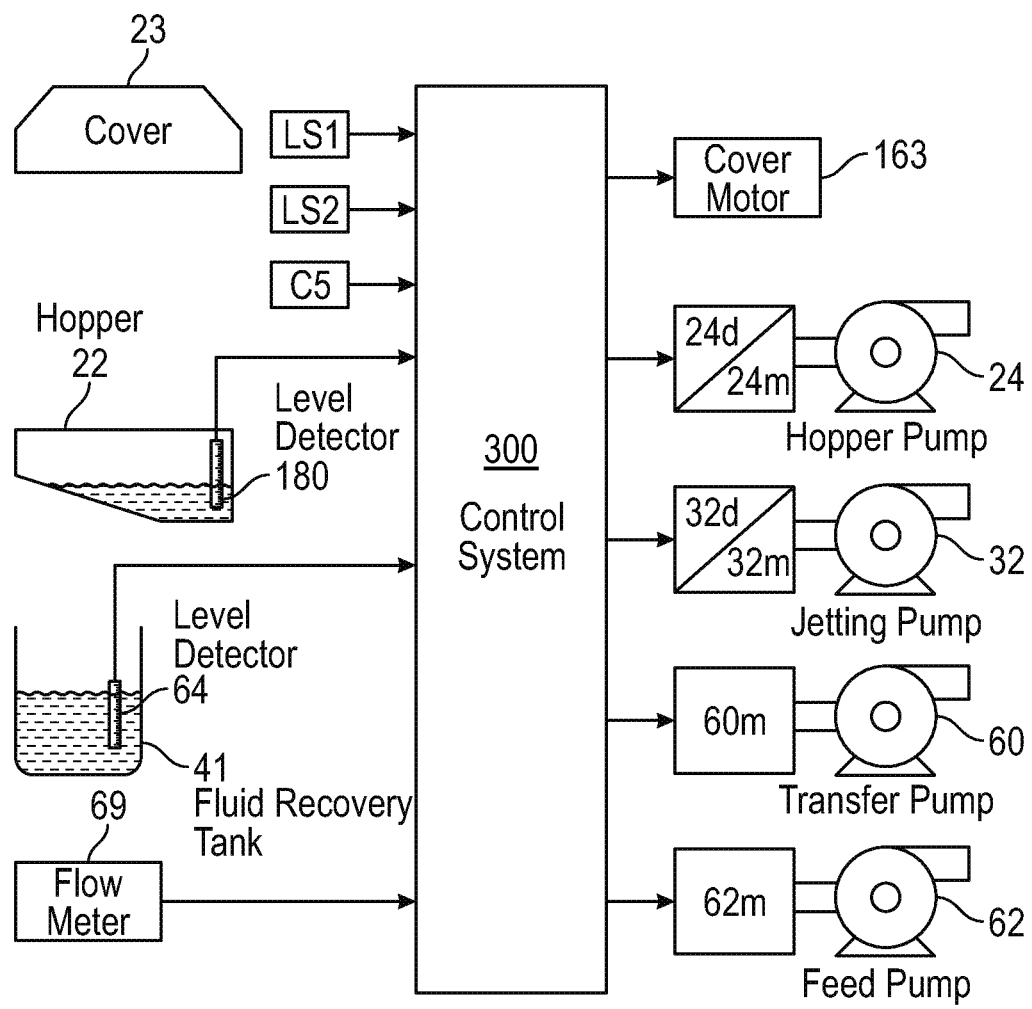
FIG. 10 is a schematic diagram of a control system 300 that can be employed with the recovery system of FIG. 1.

A control system 300 is provided to control the level of shaker tailings contained within hopper 22, to control the level of fluid in fluid recovery tank 41, to appropriately control the rotation of hopper cover 23, control the operation of centrifuges 50, 52, and for other control functions. As schematically represented in FIG. 10, control system 300 receives inputs from sensors, detectors, and switches, processes the received signals to determine the appropriate action to be taken, and then outputs command signals to effect the proper control function. For example, the output signals include signals to start/stop motors, control variable frequency drives and thus pump speeds, and other functions. Control system 300 comprises a plurality of conventional components electrically coupled together, such as a digital computer, various solid state controllers, motor starters, solid state and electromagnet relays, and the like.

As shown schematically in FIGS. 1 and 9, hopper pump 24 is driven by AC motor 24m that, in one embodiment is a 25 HP motor. Likewise, jetting pump 32 is driven by AC motor 32m that, in one embodiment is a 2 HP motor. Motors 24m and 32m may be controlled by separate variable frequency drives 24d, 32d respectively and which may each be a Model Number A1000 drive as manufactured by Yaskawa Wermac of Calgary, Alberta Canada. By controlling the speed of motors 24m and 32m, the speeds of pumps 24, 32 and their rates of fluid conveyance are likewise controlled.

It is desirable to control the level of shaker tailings in hopper chamber 22. Control system 300 receives and monitors the output signal from level detector 180 in hopper chamber 22. When the level of tailings in hopper 22 is at a first predetermined "high" level that indicates a sufficient volume is present for fluid recovery, the control system 300 will cause the variable speed drive 24d controlling the speed of hopper pump 24 to pump at relatively high speed and thus to pump a relatively high volume of shaker tailings to centrifuge 50 for processing. Likewise, when the level in hopper chamber 22 is "high," the control system 300 will cause the variable speed drive 32d controlling the speed of jetting pump 32 to pump at relatively high speed and thus to pump a relatively high volume of fluid to the nozzles 34 in hopper chamber 22. A relatively constant and controlled level in hopper chamber 22 is desired, thus the control system 300 is programmed to speed up or slow down the rpm's of pumps 24, 32 to maintain a desired level. In one embodiment, the speed of pump 24 is manually set at a first predetermined speed. The control system 300 then regulates the level of tailings in hopper chamber 22 by increasing or decreasing the rpm of the jetting pump 32.

It is further desirable to control the level of fluid in the fluid recovery tank 41. Mounted in recovery tank 41 is a level detector 64, such as a float switch, shown schematically in FIGS. 1 and 9. Level detector 64, which may be, for example, model number LS-NOV-1025 as manufactured by FPI Sensors International, provides an output signal to the control system 300 indicative of the level in tank 41. When the level detector 64 detects that the fluid in tank 41 has reached a first predetermined level, i.e., where there is sufficient fluid in the recovery tank, the control system 300 turns on transfer pump 60 so as to convey fluid from the recovery tank 41 to the suction side of feed pump 62. On the occasion that the fluid level within recovery tank 41 drops to a second predetermined or "low" level, the signal from level detector 64 initiates the control system 300 to turn off transfer pump 60 so that level in recovery tank 41 can increase. On the occasion that the fluid level within recovery tank 41 increases to another predetermined level that has been deemed abnormally high, the control system 300 is set to actuate an alarm that signals rig personnel to take appropriate manual action.

Figure 8A:
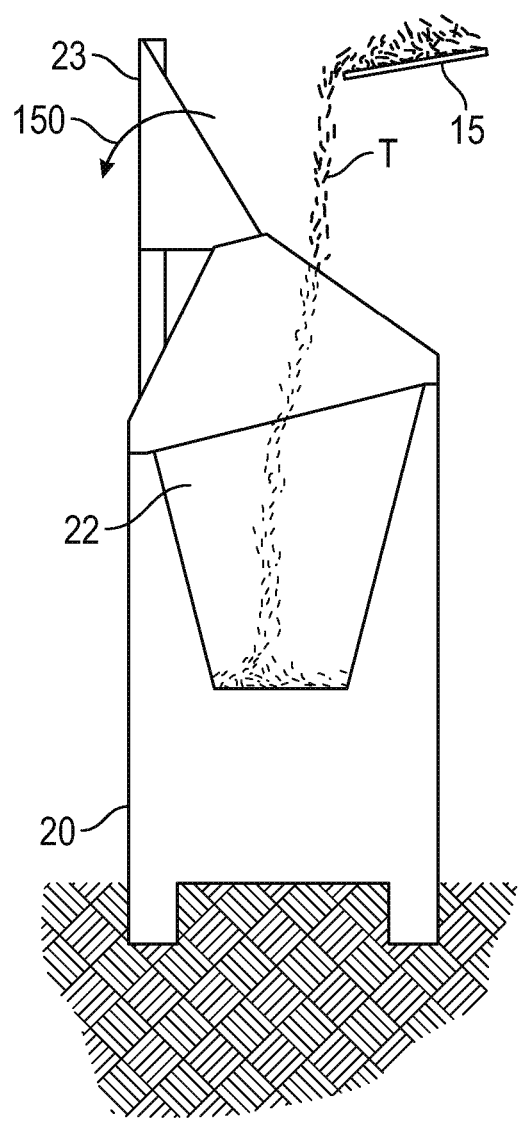
FIG. 8A is an end elevation view of the collection hopper module of FIG. 2 shown with the hopper cover in the open position, and with the hopper positioned to receive shaker tailings from an adjacent shaker machine.

The control system 300 is also configured to actuate motor 163 that controls the rotation and thus the position of cover 23 and to move the hopper cover 23 from the open position to the closed position. If it is determined that the level of shaker tailings within hopper chamber 22 is too high, i.e. reaches a second predetermined "high" level, motor 163 is actuated to move the cover 23 to the closed position. Likewise, motor 163 may be actuated to move the cover 23 to the open or closed position by manually actuating a control switch CS, shown in FIG. 10. A pair of limit switches LS1, LS2 (FIG. 10) are mounted on the hopper 21 and their outputs coupled to the control system 300. Upon the cover 23 reaching a predetermined "open" position (as shown in FIG. 8A), or predetermined "closed" position (FIG. 8B), the appropriate limit switch will signal the control system 300, which will, in turn, deactivate motor 163 so that cover 23 does not rotate further and exceed the desired angular position. Further, upon failure of either variable speed drive 24d, 32d or their associated motors or pumps, control system 300 will cause cover 23 to close so drilling operations can continue uninterrupted even though drilling fluid will not be recovered by system 10 in that situation.

Hopper Cover Operation

Figure 8B:
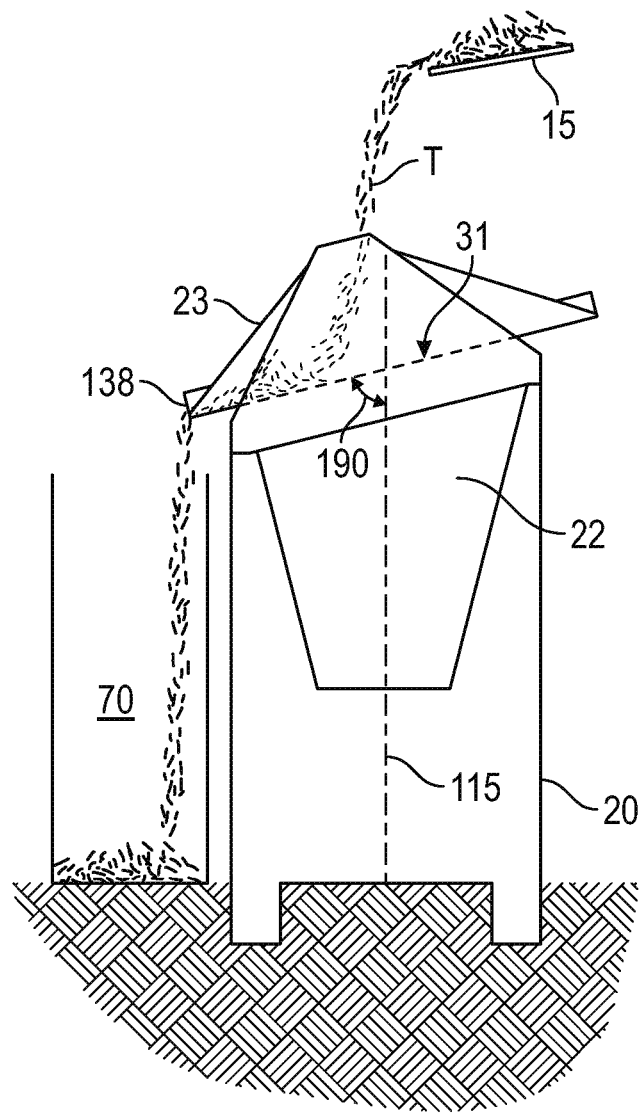
FIG. 8B is an end elevation view of the collection hopper module of FIG. 8A shown here with the hopper cover in the closed position in which the hopper chamber is covered, and with the cover diverting shaker tailings.

Referring now to FIGS. 8A, 8B, hopper cover 23 is shown schematically in two positions of its operation. In FIG. 8A, cover 23 is shown in the open position in which it is entirely set back from and thus does not cover any of the hopper chamber opening 118. In this position, the normal position for active drilling, conveying surface 131 of diverted plate 130 is generally vertical and thus parallel to the direction of gravity. With cover 23 open, shaker tailings T are conveyed off of the screening surface 15 of shakers 16 and, by gravity, are conveyed into hopper chamber 22 that is positioned below the level of screening surface 15.

Upon the manual or automatic signal to close cover 23, motor 163 (FIG. 5) is actuated to rotate cover 23 in the direction shown by arrow 150 to the closed position as shown in FIG. 8B. In the closed position, conveying surface 131 of diverter plate 130 is angled with respect to vertical and thus the direction of gravity at an acute angle 190. In particular, the angle 190 may be between approximately 55 and 75 degrees. With angle 190 being more than 59 degrees, the tailings may not be conveyed along the cover with the desired speed. In one embodiment, angle 190 is approximately 45 degrees. With cover 23 in the closed position, the shaker tailings T fall by gravity from the shaker screens 15, and land upon conveying surface 131 of plate 130. Due to the acute angle 190 of conveying surface 131 when cover 23 is in the closed position, the shaker tailings are diverted from falling into hopper chamber 22 and instead are gravity fed along conveying surface 131 into disposal bin 17. As shown in FIG. 8B, cover 23 is dimensioned such that the edge 138 of diverter plate 130 extends, not only beyond chamber 22, but also beyond the entire footprint of collection hopper module 20. This arrangement permits the shaker tailings to be conveyed into disposal bin 17 without spillage.

Furthermore, and with reference to FIG. 2, it can be seen that shaker tailings are funneled and directed along conveying surface 131 with the assistance of the extending connector plates 132 and angled cover ends 134. That is, shaker tailings that fall upon conveying surface 131 near the ends of cover 23 engage connector plates 132 and angled cover ends 134 as the tailings slide down surface 131 and are thereby funneled away from the edges and towards the center of conveying surface 131. This feature of cover 23 helps insure that the tailings properly fall within bin 17.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. The inclusion of any particular method step or action within the written description or a figure does not necessarily indicate that the particular step or action is necessary to the method. Unless expressly stated otherwise, the steps in a method claim may be performed in any order.

What is claimed is:

1. A system for recovering drilling fluid from a mixture that includes drill cuttings and drilling fluid, comprising:
   a hopper comprising an interior chamber, a plurality of nozzles configured to spray fluid into the interior chamber, and a cover that is pivotable between a first position in which the interior chamber is uncovered and a second position in which the interior chamber is covered;
   a conveying surface on the cover that forms an acute angle with respect to a direction of gravity when the cover is in the second position;
   a holding tank for containing drilling fluid;
   a first pump configured to convey drilling fluid from the holding tank to the plurality of nozzles;
   a second pump configured to convey the mixture of drill cuttings and drilling fluid from the interior chamber to a first centrifuge, the first centrifuge configured such that an effluent from the first centrifuge is conveyed to the holding tank;
   a first level detector configured to sense a level of the mixture in the interior chamber and to provide an output in response to the sensed level;
   a control system coupled to the first level detector;
   a drive motor coupled to the cover and configured to move the cover between the first position and the second position in response to a control signal provided by the control system, the control system configured to cause the drive motor to move the cover to the second position when the level of the mixture in the interior chamber reaches a first predetermined level.

2. The system of claim 1 wherein the control system is configured to control a speed of at least one of the first and second pumps in response to the output from the first level detector.

3. The system of claim 1 further comprising a third pump configured to convey drilling fluid from the holding tank to a suction side of a fourth pump, wherein a discharge side of the fourth pump is configured to convey drilling fluid to a second centrifuge.

4. The system of claim 3 further comprising:
   a second level detector configured to sense a fluid level in the holding tank and provide an output to the control system in response to the sensed fluid level;
   wherein the control system is configured to turn on the third pump when the fluid level in the holding tank rises to a predetermined level.

5. The system of claim 2 wherein the control system is further configured to turn off at least one of the first and second pumps when the level of the mixture in the interior chamber reaches a second predetermined level.

6. The system of claim 2 wherein the first level detector is configured to provide an output signal that is proportional to the level of the mixture detected in the interior chamber.

7. The system of claim 1 wherein the first and second pumps are low shear pumps.

* * * * *